United States Patent [19]

Allan et al.

[11] 4,421,458

[45] Dec. 20, 1983

[54] WIND POWERED TURBINE

[75] Inventors: John Allan, Bembridge; Peter J. Musgrove, Reading, both of England

[73] Assignee: Sir Robert McAlpine & Sons (Trade Investments) Limited, London, England

[21] Appl. No.: 309,105

[22] Filed: Oct. 6, 1981

[30] Foreign Application Priority Data

Oct. 7, 1980 [GB] United Kingdom ............... 8032238

[51] Int. Cl.³ ............................................. F03D 7/06
[52] U.S. Cl. ................................... 416/117; 416/119; 416/132 B
[58] Field of Search .................... 416/117, 119, 132 B

[56] References Cited

U.S. PATENT DOCUMENTS

| 1,443,912 | 1/1923 | Dominguez | 416/197 A X |
|---|---|---|---|
| 3,918,839 | 11/1975 | Blackwell et al. | 416/117 X |
| 4,087,202 | 5/1978 | Musgrove | 416/117 X |
| 4,204,805 | 5/1980 | Bolie | 416/117 X |
| 4,274,809 | 6/1981 | Delgado et al. | 416/117 |
| 4,325,674 | 4/1982 | Ljungström | 416/117 X |
| 4,334,823 | 6/1982 | Sharp | 416/119 |

FOREIGN PATENT DOCUMENTS

| 20610 | of 0000 | Fed. Rep. of Germany | 416/117 |
|---|---|---|---|
| 116657 | 1/1901 | Fed. Rep. of Germany | 416/132 B |
| 403693 | 11/1909 | France | 416/117 |
| 2298707 | 8/1976 | France | 416/117 |
| 21920 | of 1911 | United Kingdom | 416/132 A |

Primary Examiner—Everette A. Powell, Jr.
Attorney, Agent, or Firm—Cushman, Darby & Cushman

[57] ABSTRACT

A wind powered turbine of the vertical axis type having rotor blades (3) carried on a rotor arm (2), in which the blades can be reefed to reduce torque on the turbine. The blades have two portions (6, 7) pivotable with respect to one another by the reefing means so as to move from a position parallel to the rotation axis to a position at which they form an angle about a plane perpendicular to the rotation axis.

12 Claims, 8 Drawing Figures

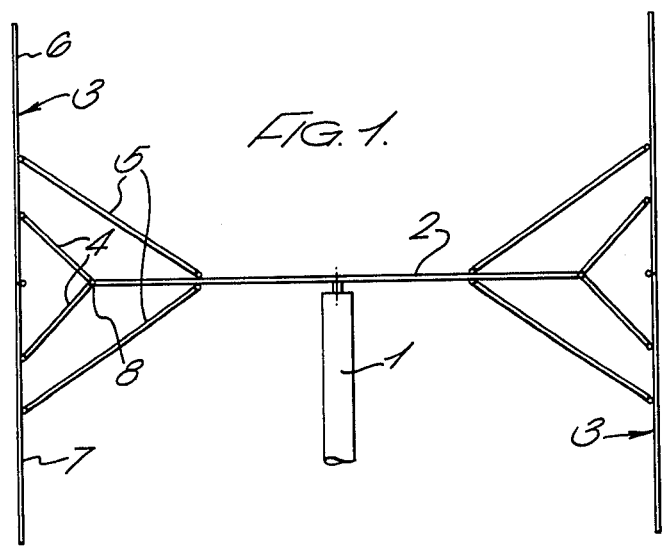
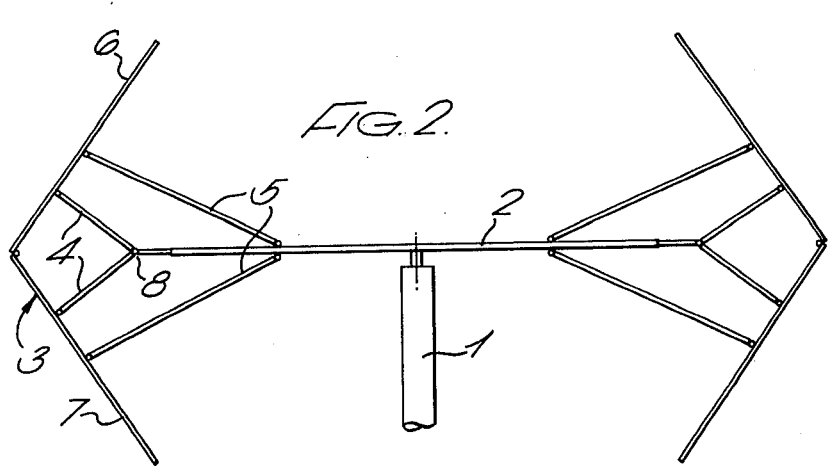

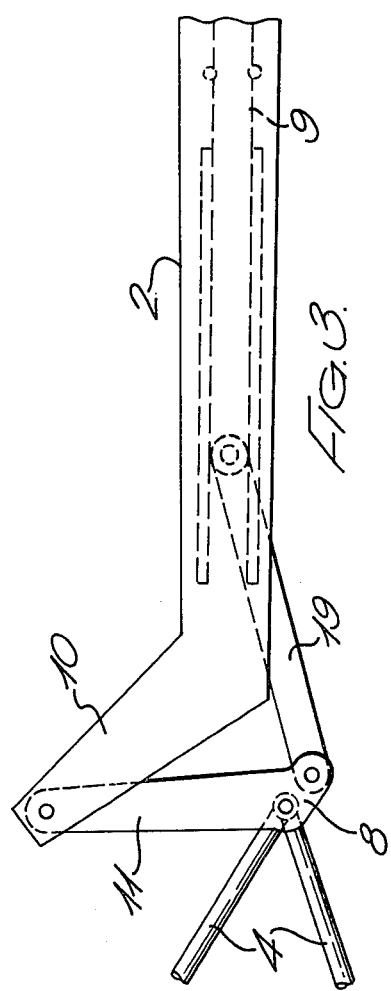
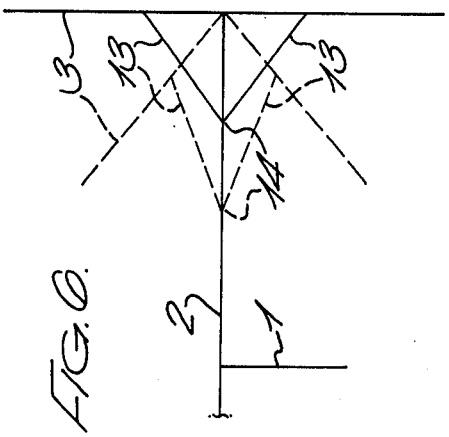
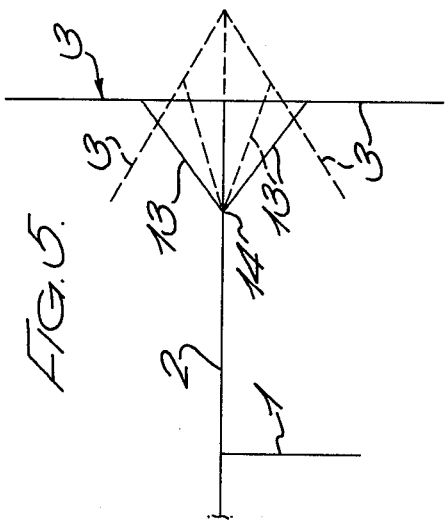

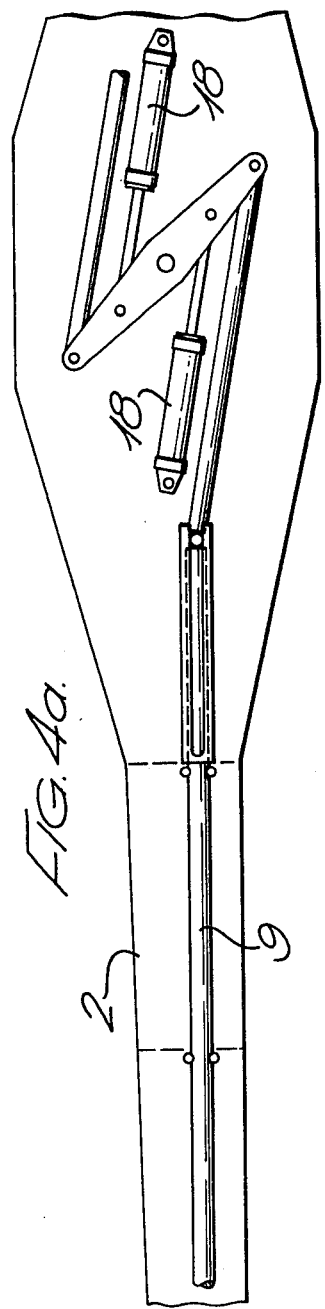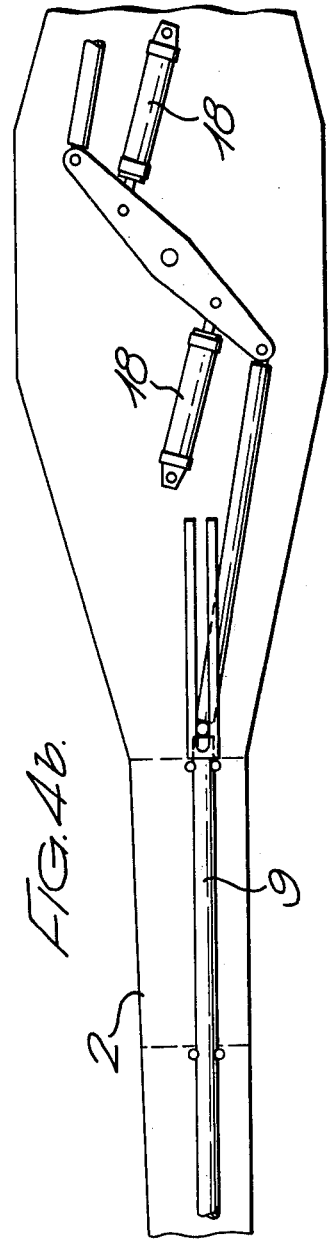

WIND POWERED TURBINE

The present invention relates to a wind powered turbine and in particular to an H-type vertical axis turbine having variable geometry as a means of power control.

H-type vertical axis wind turbines such as the Musgrove turbine described in U.K. Patent Specification 1,549,767 have straight blades of symmetrical aero-foil cross-section uniformly arranged around the rotation axis of the turbine and each pivotally connected to a rigid rotor arm. The rotor arm is rotatable at its center on a supporting structure. In normal operation the blades are held parallel to the vertical rotation axis of the turbine and as the rotor arm turns the blades intersect the air currents passing across the turbine. The velocity of each blade combined with the air velocity produces a relative velocity of the blade through the air which due to the aerofoil shape of the blade produces both lift and drag forces on the blade. When the blade velocity in relation to the wind velocity is sufficiently great components of the lift and draft when resolved in the direction of rotation of the turbine show a net positive torque on the turbine. The turbine operates whatever the direction of the wind and the torque generated increases with increasing wind speed.

It has been found that high wind speeds can damage the turbine due to the high torque generated and to avoid this the turbine is reefed by allowing each blade to pivot outwards at one end if the wind speed becomes excessive. This outward pivoting causes the blades to describe a cone shape which reduces the torque since the effective cross-sectional area of the turbine and the blade aerodynamic efficiency is reduced.

However, when the blades cone outwards it is found that a considerable bending moment is applied to the rotor arm and in order to resist this bending moment the supporting structure must be made more rigid than would normally be required to simply support the turbine, with a consequent increase in the cost and complexity of the equipment.

The bending moment is due to a component of lift and drag forces on each blade which is resolved normal to the chordal plane of the blade. This component is inward towards the rotation axis of the turbine on the up-wind side and outwards away from the rotation axis of the turbine on the downwind side. When the blades cone outwards this component is angled to produce a vertical load on the rotor arm which reverses direction when passing from up-wind to down-wind, resulting in the bending moment.

According to the present invention there is provided a wind powered turbine comprising;
a support member,
a rotor member rotatable on the supporting member about a rotation axis,
a plurality of rotor blades carried by the rotor member at positions spaced around and equidistant from the rotation axis, each blade having two portions capable of pivotal movement with respect to one another,
and reefing means capable of pivoting the blade portions in opposite directions so as to move them from a position parallel to the rotation axis to a position at which they form an angle about a plane perpendicular to the rotation axis.

Preferably, the two blade portions are substantially identical and the reefing means pivots the blade portions by substantially equal and opposite amounts.

Various wind powered turbines constructed in accordance with the present invention will now be described by way of example and with reference to the accompanying partly schematic drawings wherein like parts have identical reference numerals and in which:

FIG. 1 is a side elevational view of a rotor assembly of a wind turbine in its normal operating position;

FIG. 2 is a side elevational view of the rotor assembly of FIG. 1 in its reefed position;

FIGS. 3 and 4 are enlarged side and plan views of different parts of a preferred rotor assembly;

FIG. 5 is a diagrammatic representation of part of the rotor arm assembly of another embodiment of the wind turbine, its normal position being shown in full lines and its reefed position being shown in broken lines; and FIGS. 6 to 8 are diagrammatic representations similar to FIG. 5, each showing a different construction of wind turbine.

Figure 7:
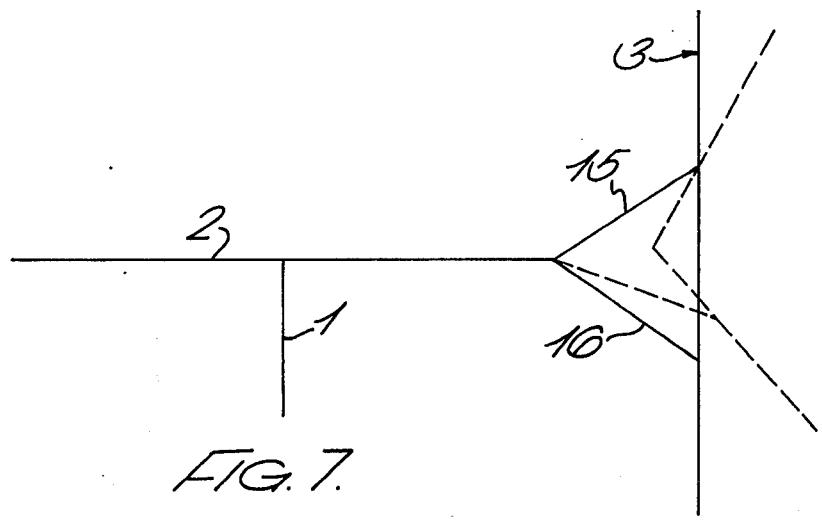

Referring to FIGS. 1 and 2 there is shown a rotor assembly for a wind powered turbine, the assembly being supported for rotation about a vertical axis on a supporting column 1. This supporting column is of sufficient height to ensure that the wind can blow freely across the rotor assembly and the assembly is clear of obstructions at ground level.

The assembly comprises a rotor arm 2 which is supported at its centre for rotation on the supporting column 1, and two aerofoil blades 3. Each blade is connected to one end of the rotor arm by struts 4, and further supported at a position intermediate the end of the rotor arm and its centre by struts 5. The struts 4 and 5 are each pivoted at their respective ends to the rotor arm 2 and to the blade 3 at positions equally spaced on either side of the middle of the blade 3.

Each blade 3 is of aerofoil cross-section with the leading edge of the blade facing in the direction of rotation of the rotor assembly and the chord line tangential to the circle in which it rotates. The blade comprises two straight rigid portions 6 and 7 joined by a hinge parallel to the chord line at the middle of the blade, which enables the two portions 6 and 7 to fold back into a V-shaped configuration as seen in FIG. 2.

The pivot point 8 for the struts 4 on the rotor arm 2 is moveable relative to the axis of rotation of the rotor arm in a substantially radial direction. Outward movement of this pivot point 8 causes the two portions 6 and 7 to rotate by substantially equal amounts and fold back into the reefing position of FIG. 2 where the cross-sectional area of the rotor assembly and the blade aerodynamic efficiency are reduced, which then reduces the torque on the rotor arm from the wind.

In use, the turbine normally operates with the blades parallel to the axis of rotation as in FIG. 1. Wind velocity across the turbine combined with the rotational velocity of the blades produces an effective relative velocity between the wind and each blade which is at an angle to the chord line of the blade. This creates a lift force and a drag force on the blade the lift force having a component in the direction of rotation of the rotor assembly which overcomes the drag and so drives the turbine, and a component normal to the chordal plane of the blade which changes direction on going from the up-wind to the down-wind side of the rotor assembly so as to produce a force along the rotor arm 2. The supporting column is sufficiently rigid to resist this force along the rotor arm in the direction of the wind.

If the wind velocity becomes too high the torque generated by the rotor assembly as in FIG. 1 will be such as possibly to cause damage to the structure of the turbine and therefore the pivot points 8 are moved equally outwards from the axis of rotation until the torque has fallen to a suitable value. This reefing of the blades causes the component of lift which acts perpendicular to the chordal plane to rotate and produce a vertical force on each portion of the blades as well as a force along the rotor arm.

However, since the portions of each blade are equal in length and rotate by substantially equal amounts in opposite directions the vertical force on one portion will be approximately equal and opposite to the vertical force on the other portion, producing substantially no overall vertical forces on the rotor arm 2. Thus, the bending moment acting on the rotor arm during reefing is considerably reduced in relation to that of the original Musgrove turbine construction. This reduces the engineering constraints on the turbine supports and in particular allows the rotor arm length to be increased without danger of producing a large bending moment during reefing.

A slightly modified construction to that shown in FIGS. 1 and 2 is shown partly reefed in FIG. 3. In this construction, each end of the rotor arm has a raised "beak" 10 at the free end of which is pivoted a link 11. The free end portion of the link 11 is pivotally connected to the end of each of the two struts 4 and to a link 19 at the end of a push rod 9 mounted in the rotor arm 2. Outward longitudinal movement of the push rod pivots the link 11 and so moves the pivot point 8 outwards. This pivotal movement means that the pivot point does not move exactly radially outwards but along a slight curve which tilts the blade slightly during reefing. The tilting of the blade will produce a small net vertical force during reefing, but considerably less than in the conventional construction. The intermediate link 11 reduces the shear forces acting on the push rod during operation of the turbine. The push rods 9 are operated by hydraulic cylinders 18 at the centre of the rotor arm as seen in FIG. 4. FIG. 4a shows in plan view the position of the push rods and cylinders when the blades are vertical and FIG. 4b shows them when fully reefed. The link 11 may alternatively be operated directly by hydraulic pistons positioned at the ends of the arm 2.

The struts 5, struts 4 and beak 10 of the rotor arm 2 are of symmetrical aerofoil cross-section similar to that of the blades 3, having their leading edges facing in the direction of rotation of the rotor assembly and producing a component of lift in that direction which tends to overcome the drag force, so as to contribute some positive driving torque to the turbine. Each strut 5 carries direct loads and the shear from the forces tangential to the rotation. The struts 4 apart from controlling the reefing of the blades, assist in maintaining the required shape of the blades by providing further support for them and share the inertial and aerodynamic loads with the struts 5. This enables light components to be used in the blade construction and struts, which reduces centrifugal forces and so also enables lighter and cheaper components to be used in other parts of the turbine as well.

In a further modification of the assembly of FIG. 1 the pivot point 8 may be fixed at the ends of the rotor arm 2 and the pivot point 12 of the struts 5 be made movable inwards along the rotor arm so as to reef the blades. However, in this construction the blades would be positioned further in towards the axis of rotation when reefed than as shown in FIG. 2. which would reduce the blade velocity for the same rotational speed and at a certain minimum blade velocity the relative velocity between the blade and the wind reaches an angle to the blade chord line at which stalling of the whole blade can occur.

Instead of moving the pivot point 8 or 12, in order to reef the blades, it is possible to construct the struts 4 or 5 so that they may be extended or retracted, the change in length of each strut 4 or each strut 5 being the same so as to prevent any tilting of the blade during reefing.

Various other arrangements of struts and pistons or other actuating means are also capable of pivoting two halves of a vertical blade in opposite directions so that they make substantially the same acute angle with the horizontal and some of these are shown in FIGS. 5 to 8. In each figure only one blade and its struts are shown, the other blade and struts being the same. The position of the blade 3 and its struts during normal operation when the blades are parallel to the axis of rotation is shown in solid lines and the position when the blades are reefed is shown in dotted lines in each figure.

Referring to FIG. 5, the blade 3 is supported by two rigid struts 13 pivoted to the rotor arm 2 and to the respective portions of the blade 3 at positions equally spaced on either side of the middle of the blade 3, and by the end of the rotor arm 2 pivoted to the two portions of the blade 3 at its middle. Reefing is produced by moving the end of the rotor arm 2 radially outwards.

This construction is simpler than that in FIG. 1 but requires a substantial outward movement of the end of the rotor arm 2 in order to produce the same degree of reefing.

Referring to FIG. 6, this is similar to the construction of FIG. 5, but in this construction reefing is produced by moving the pivot point 14 of the two rigid struts 13 radially inwards rather than the end of the rotor arm radially outwards. There is a disadvantage over the construction of FIG. 5 in that the reefed blades are further in towards the axis of rotation which, as explained earlier, raises the stalling speed of the turbine. Instead of moving the pivot point 14 inwards it is possible to reduce the length of the struts 13.

Referring to FIG. 7, the blade 3 is supported by a rigid extension 15 of the rotor arm and a strut 16 which is pivoted to the rotor arm, the extension 15 and strut 16 being pivoted to the respective portions of the blade 3 at positions equally spaced on either side of the middle of the blade. Reefing is produced by rotation the upper portion of the blade 3 about the pivot on the extension 15. The rotation is preferably carried out by means of a piston and cylinder connected between the extension 15 and the upper portion of the blade 3.

In FIG. 7, the rotation of the two portions of the blade 3 is in a sense such that the V-shape formed thereby points inwards towards the axis of rotation of the rotor assembly. Reversing the sense of the rotation of the upper portion of the blade 3 would however give a V-shape pointing outwards as in FIGS. 2, 5 and 6 and similarly in the construction shown in those figures reversing the movement required to reef the blades would give a V-shape pointing inwards as in FIG. 7.

Figure 8:
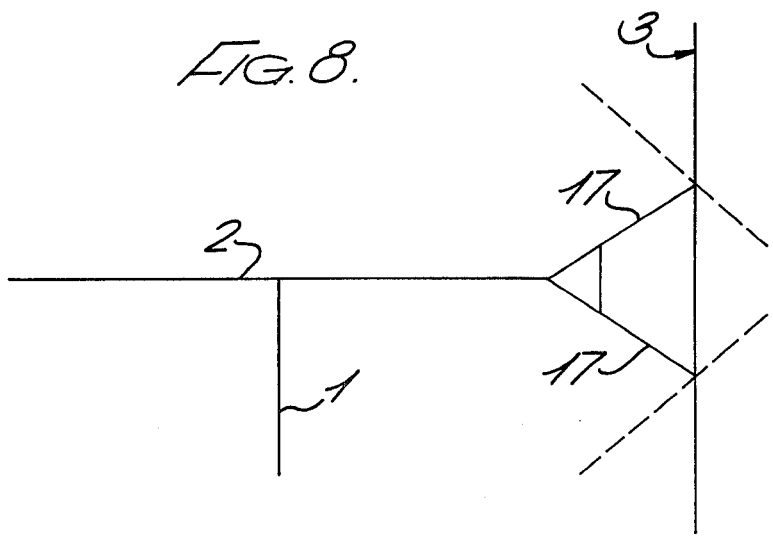

Referring to FIG. 8, the two portions of the blade 3 are not connected at the middle of the blade as in the previously described constructions, but are free to move independently. The sections are pivotally connected to rigid extensions 17 of the rotor arm 2 at positions equally on either side of the middle of the blade 3. Reefing of the blade is produced by rotating the portions of the blade through equal and opposite angles about their pivotal connections to the extensions 17. The rotation is preferably carried out by pistons acting between the extensions and the portions of the blade 3 to be rotated. As in the construction of FIG. 7, the blades may be reefed so as to form a V-shape pointing outwards (as shown in FIG. 8) or a V-shape pointing inwards.

In all the above described constructions of the rotor assembly for a wind powered turbine there are two blades 3 arranged on opposite ends of a straight rotor arm 2. The invention is however, equally applicable to such a wind turbine which has three or more blades uniformly arranged around the rotation axis of the turbine.

We claim:

1. A wind powered turbine comprising:
   a supporting member,
   a rotor member rotatable on the supporting member about a vertical rotation axis,
   a plurality of rotor blades carried by the rotor member at positions spaced around and equidistant from the rotation axis, each blade comprising two half blade portions of aerofoil section, each half blade portion defining the total width of the rotor blade, and means at or adjacent a central region of each half blade portion mounting each half blade portion for pivotal movement as a whole relative to the other half blade portion,
   and reefing means capable of pivoting the half blade portions in opposite directions so as to move them from a position parallel to the rotation axis to a position at which they form an angle to the rotation axis while remaining in the plane defined by the axis of rotation and the rotor member.

2. A turbine according to claim 1 wherein the two half blade portions are substantially identical and the reefing means pivots the half blade portions by substantially equal and opposite amounts.

3. A turbine according to claim 1 or 2 wherein each half blade portion is joined to the rotor member by first and second struts, the outer ends of the struts being pivotally secured to the half blade portion at spaced positions and the positioning of these outer ends with respect to the rotor member being determined by the reefing means.

4. A turbine according to claim 3 wherein the struts are of fixed length, each first strut having its inner end pivotally secured to the rotor member and each second strut having its inner end movable by the reefing means with respect to the rotor member.

5. A turbine according to claim 4 wherein the two portions of each blade are hinged together and their two second struts are pivotally linked at their inner ends, these being movable by the reefing means in a substantially radial direction with respect to the rotation axis.

6. A turbine according to claim 5 wherein the reefing means for each blade comprises a push rod extending generally radially outwards with respect to the rotation axis and linked at its outer end to the inner ends of the second struts, and actuating means secured to the rotor member and arranged to move the push rod longitudinally during reefing, the inner ends of the second struts being pivotally secured to the free end of a support link pivoted on the rotor member.

7. A turbine according to claim 5 wherein each half blade portion has its first strut secured to the blade portion at a position further from the hinge joining the half blade portions than its second strut.

8. A turbine according to claim 1 or 2 wherein each half blade portion is joined to the rotor member by a strut, the outer end of the strut being pivotally secured to the rotor member, the two half blade portions of each blade are hinged together and the reefing means moves the hinge substantially radially with respect to the rotation axis during reefing.

9. A turbine according to claim 1 or 2 wherein each half blade portion is joined to the rotor member by a strut and is pivotally secured to the rotor member at its inner end, the outer end of the strut being pivotally secured to the half blade portion and being movable by the reefing means with respect to the rotor member.

10. A turbine according to claim 1 or 2 wherein one half blade portion of each blade is pivotally secured to the rotor member, and is hinged to the other half blade portion, which is joined to the rotor member by a strut, the outer end of the strut being pivotally secured to the half blade portion and being movable with respect to the rotor member by the reefing means.

11. A turbine according to claim 1 or 2 wherein each half blade portion is pivotally secured to the rotor member, and the reefing means is arranged to rotate the half blade portions independently.

12. A turbine according to claim 3 wherein the struts, rotor member and rotor blades are of symmetrical aerofoil cross-section having their leading edges facing in the direction of rotation of the turbine.

* * * * *